United States Patent [19]
Patten et al.

[11] Patent Number: 5,497,666
[45] Date of Patent: Mar. 12, 1996

[54] INCREASED SENSITIVITY CORIOLIS EFFECT FLOWMETER USING NODAL-PROXIMATE SENSORS

[75] Inventors: Andrew T. Patten; Charles P. Stack, both of Louisville; Andrew K. Levien, Evergreen, all of Colo.

[73] Assignee: Micro Motion, Inc., Boulder, Colo.

[21] Appl. No.: 277,661

[22] Filed: Jul. 20, 1994

[51] Int. Cl.[6] ................................................. G01F 1/84
[52] U.S. Cl. ................................. 73/861.38; 73/861.37
[58] Field of Search .......................... 73/861.38, 861.37

[56] References Cited

U.S. PATENT DOCUMENTS

| | | | |
|---|---|---|---|
| 4,491,025 | 1/1985 | Smith et al. | 73/861.38 |
| 4,658,657 | 4/1987 | Kuppers | 73/861.38 |
| 4,949,583 | 8/1990 | Lang et al. | 73/861.37 |
| 5,301,557 | 4/1994 | Cage et al. | 73/861.38 |
| 5,321,991 | 6/1994 | Kalotay | 73/861.37 |
| 5,349,872 | 10/1994 | Kalotay et al. | 73/861.38 |

OTHER PUBLICATIONS

Coriolis Effect in Mass Flow Metering, H. Rasziller and F. Durst, Erlangen—Applied Mechanics, pp. 192–214 61 (1991), Springer–Verlag 1991.

Primary Examiner—Richard Chilcot
Assistant Examiner—Jewel V. Artis
Attorney, Agent, or Firm—Duft, Graziano & Forest

[57] ABSTRACT

An increased sensitivity Coriolis flowmeter having one or more drivers oscillates a flow tube, or tubes, at pre-determined frequencies thereby producing active and/or static nodes at points along the flowtube(s). The increased sensitivity of the present flowmeter is provided by controllably locating sensors in close proximity to the static nodes and/or active nodes. In a first embodiment, the flowtubes are oscillated in a manner generating a single active node with sensors positioned in close proximity to, and on opposing sides of, the active node. In a second embodiment, the flowtubes are oscillated in a manner generating multiple active nodes where the sensors are located on opposing sides of each active node, or on opposing flowtubes where one sensor is above an active node on one leg and a second sensor below the active node on the opposing leg. In another embodiment, sensors are positioned in close proximity to static nodes in addition to the sensor positions for active nodes as previously stated. In all embodiments, the sensors are controllably positioned proximate to active nodes and/or static nodes in a manner that maximizes the signal to noise ratio of the signal generated by the sensor electronics.

22 Claims, 6 Drawing Sheets

5,497,666

INCREASED SENSITIVITY CORIOLIS EFFECT FLOWMETER USING NODAL-PROXIMATE SENSORS

BACKGROUND OF THE INVENTION

This invention relates to Coriolis-effect flowmeters and, in particular, to a Coriolis effect flowmeter having pick-off sensors proximate one or more oscillatory nodes of the flowmeter tubing.

PROBLEM

It is known to use Coriolis effect flowmeters to measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith, et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected conduit on the inlet side of the flowmeter, is directed through the flow tube or tubes, and exits the flowmeter through the outlet side. The natural vibration modes of the vibrating, fluid filled flow tubes are defined in part by the combined mass of the flow tubes and the material within the flow tubes.

When there is no flow through the flowmeter, all points along the flow tube oscillate with identical phase due to an applied driver force. As material begins to flow, Coriolis accelerations cause each point along the vibrating flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

A complicating factor in this measurement is that the density of typical process fluids varies. Changes in density cause the frequencies of the natural modes to vary. Since the flowmeter's control system maintains resonance, the oscillation frequency varies in response to changes in density. Mass flow rate in this situation is proportional to the ratio of phase difference and oscillation frequency.

The above-mentioned U.S. Pat. No. Re. 31,450 to Smith discloses a Coriolis flowmeter that avoids the need for measuring both phase difference and oscillation frequency. Phase difference is determined by measuring the time delay between level crossings of the two sinusoidal signals of the flowmeter. When this method is used, the variations in the oscillation frequency cancel, and mass flow rate is proportional to the measured time delay. This measurement method is hereinafter referred to as a time delay or $\Delta t$ measurement.

Since the phase difference between two sensor output signals is proportional to the mass flow rate of material through the flow tube(s), a point can sometimes be reached where the phase difference is not measurable as the mass flow rate decreases because of instrumentation sensitivity limitations and noise considerations. When it is desired to measure the mass flow rate of a low density material at a low pressure, such as a gas, extremely high phase measurement sensitivity is required to detect the correspondingly low phase difference represented by the output signals of the flow meter. Many conventional Coriolis flowmeters do not have adequate phase measurement sensitivity to measure gas flow under low pressures or at low flow rates.

A need therefore exists for a flowmeter of increased sensitivity that measures the mass flow rate of a material such as a gas at low flow rates and at low pressures.

SOLUTION

The above problem of providing greater material flow rate sensitivity for a Coriolis flowmeter is solved by the flowmeter of present invention which provides for the controllable placement of the sensors in close proximity to a node, where a node includes certain static nodes as well as certain vibrational nodes (hereinafter "active nodes") of the flow tubes to provide the increased sensitivity. A node is a point of zero oscillatory amplitude along an oscillating flow tube. A static node is a node located at a flow tube brace bar or other immobilizing flow tube terminus where flow tube oscillation is mechanically inhibited to create a point of zero oscillatory amplitude. An active node is a node or nodes freely occurring anywhere along an oscillating flow tube other than at a static node location, where the active node location(s) is determined by the oscillation frequency, driver placement, and resulting flow tube oscillation at a time when no material is flowing through the tube.

The present invention provides an improved method of and apparatus for measuring the mass flow rate of material flowing through a conduit. The disclosed apparatus and method provides for increased measurement sensitivity so that the mass flow rate of low density fluids such as low pressure gases can be measured. In operation, a flowmeter tube embodying the invention is oscillated and a time difference ($\Delta t$) measurement is obtained from output signals of a pair of sensors controllably located in close proximity to one or more nodes. The increased measurement sensitivity is provided by positioning the pair of sensors as close as practicable to a node along the flow tube.

The flowmeter of the present invention uses one or more drivers that oscillate a flow tube (or two flow tubes having a parallel alignment) at a frequency which produces the desired active nodes. These drivers contact the flow tube(s) at or near an anti-node or at any other location except a node of the natural frequency of oscillation of the flow tube(s).

Two exemplary embodiments of the present invention are disclosed which utilize two parallel "modified U-shaped" flow tubes having a substantially straight top section which connects two downwardly and inwardly sloping flow tube "legs". In one embodiment, the flow tubes are oscillated in such a manner as to generate a single active node which may be situated at the midpoint of the top section connecting the legs of the flow tubes. Two sensors for sensing movement of the flow tubes are located in close proximity to, and on opposite sides of the active node.

In alternative embodiments, the flow tubes are oscillated at higher frequencies (than in the first embodiment) in order to produce multiple active nodes. In these alternative embodiments, two pick-off sensors can be positioned on opposite legs of the tubes with one sensor positioned above an active node on one leg of the tubes and the other sensor positioned below a corresponding active node on the other leg of the tubes. This positioning of the sensors on opposite flow tube legs allows the sensors to be placed as close as desired to the corresponding active node without being limited by the physical size of the sensors.

In all of the modes of oscillation, the pick-off sensors are controllably placed in sufficient proximity to an active or static node to maximize the signal to noise ratio of the signal generated by the sensor electronics.

The flowmeter of the present invention can be used with either substantially straight or curved tubes, as well as with other tube shapes.

DESCRIPTION OF THE DRAWING

The above and other advantages and features of the invention may be better understood from a reading of the following description thereof taken in conjunction with the drawing in which.

DETAILED DESCRIPTION

The Prior Art

Figure 1:
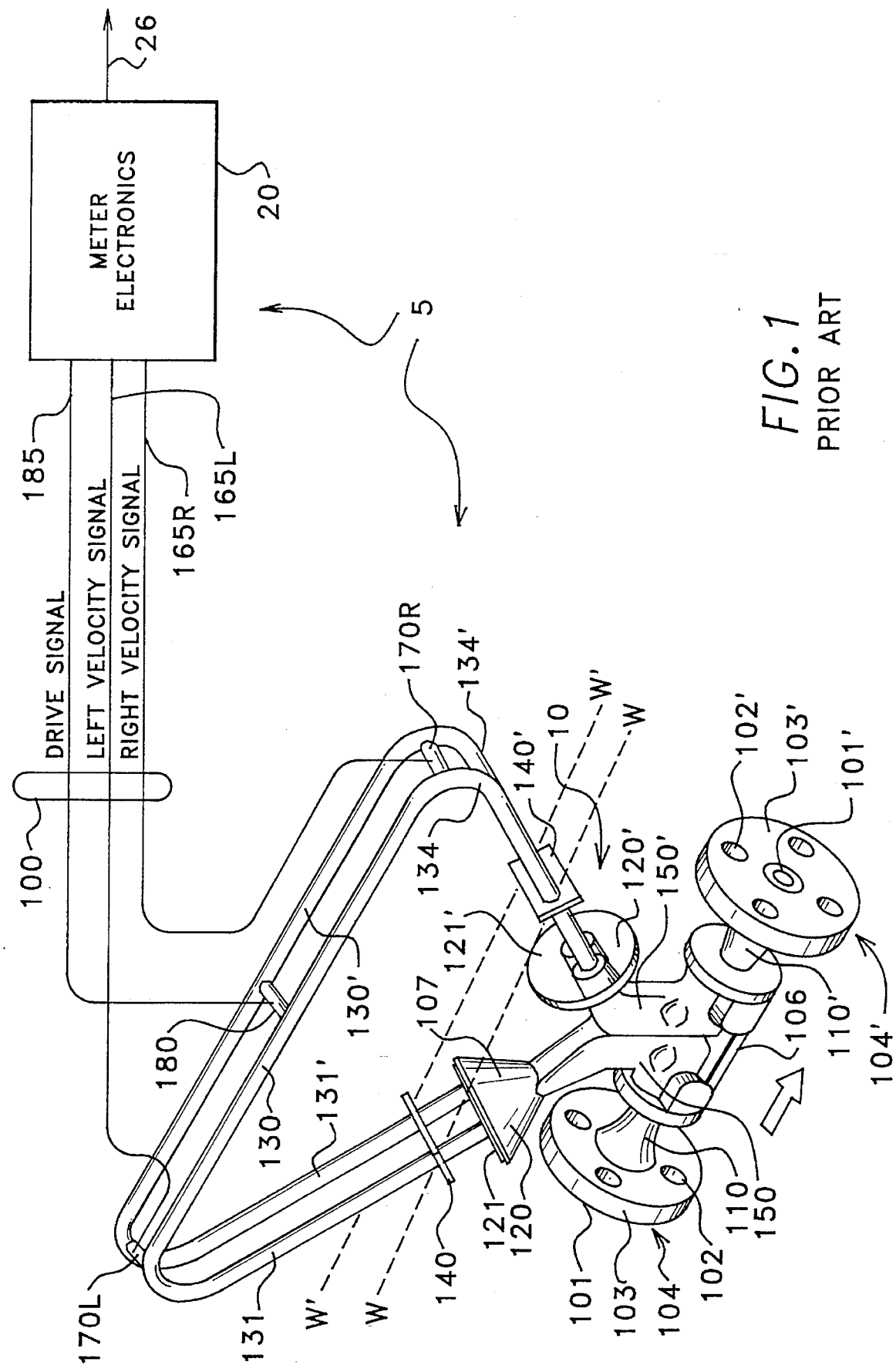
FIG. 1 illustrates a prior art Coriolis flowmeter.

FIG. 1 shows a Coriolis meter assembly 10 and meter electronics 20. Meter electronics 20 are connected to meter assembly 10 via leads 100 to provide density, mass flow rate, volume flow rate and totalized mass flow information to path 26.

Meter assembly 10 includes a pair of manifolds 110 and 110', tubular elements 150 and 150', a pair of parallel flow tubes 130 and 130', drive mechanism 180, and a pair of velocity sensors 170L and 170R. Flow tubes 130 and 130' have two essentially straight inlet legs 131 and 131' and outlet legs 134 and 134' which converge towards each other at manifold elements 120 and 120'. Brace bars 140 and 140' define the axis W and W' about which each flow tube oscillates.

The side legs 131 and 134 of flow tubes 130 and 130' are fixedly attached to flow tube mounting blocks 120 and 120' which, in turn, are fixedly attached to manifold elements 150 and 150'. This provides a continuous closed material path through Coriolis meter assembly 10.

When meter assembly 10 having flange 103 having holes 102 is connected, via inlet end 104' and outlet end 101' into a flow tube system (not shown) which carries the process material that is being measured, process material enters the meter through an orifice 101 in flange 103 of end 104 of inlet manifold 110 and is conducted through a passageway therein having a gradually changing crosssection to manifold elements 120 having a surface 121. There, the material is divided and routed through legs 130 and 131' flow tubes 130 and 130' and legs 134 and 134'. Upon exiting legs 134 and 134', the process material is recombined in a single stream within manifold 150' and is thereafter routed to exit manifold 110'. Within exit manifold 110', the material flows through a passageway having a similar gradually changing cross-section to that of inlet manifold 110 to an orifice 101' in outlet end 104'. Exit end 104' is connected by flange 103' having bolt holes 102' to to a conduit system (not shown).

Flow tubes 130 and 130' are selected and appropriately mounted to the elements 120 and 120' so as to have substantially the same mass distribution, moments of inertia and elastic modulus about bending axes W—W and W'—W', respectively. These bending axes are located static rodes and are near respective flow tube brace bars 140 and 140' and elements 120 and 120'. The flow tubes extend outwardly from the mounting blocks in an essentially parallel fashion and have substantially equal mass distributions, moments of inertia and elastic modulus about their respective bending axes.

Both flow tubes 130 are driven by driver 180 in opposite directions about their respective bending axes W and W' at what is termed the first out-of-phase natural frequency of the flowmeter. This mode of vibration is also referred to as an out-of-phase bending mode. Both flow tubes 130 and 130' vibrate out-of-phase as the tines of a tuning fork. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Drive element 180 and the generated Coriolis forces cause oscillation of flow tubes 130 about axes ward W' in a periodic manner. During the first half of the oscillation period of the flow tubes 130, the adjacent side legs 131 and 131', are forced closer together than their counterpart side legs 134 and 134', and reach the end point of their travel where their velocity crosses zero before their counterparts do so. In the second half of the Coriolis oscillation period, the opposite relative motion of the flow tubes 130 occurs, i.e., adjacent side legs 134 and 134', are forced closer together than their counterpart side legs 131 and 131', and therefore legs 134 reach the end point of their travel where their velocity crosses zero before legs 131 and 131' do so. This time interval (also referred to herein as the phase difference at a particular frequency, or time difference, or simply "$\Delta t$" value) which elapses from the instant one pair of adjacent side legs reaches their end point of travel to the instant the counterpart pair of side legs (i.e., those forced further apart), reach their respective end point, is substantially proportional to the mass flow rate of the process material flowing through meter assembly 10.

To measure the time interval, $\Delta t$, sensors 170L and 170R are attached to flow tubes 130 and 130' near their upper ends. The sensors may be of any well-known type. The signals generated by sensors 170L and 170R provide a velocity profile of the complete travel of the flow tubes and can be processed by meter electronics 20 by any one of a number of well known methods to compute the time interval $\Delta t$ and, in turn, the mass flow of the material passing through the meter.

Sensors 170L and 170R apply left and right velocity signals to leads 165L and 165R, respectively. The time difference, or $\Delta t$, measurement provides a manifestation of the phase difference that occurs between the left and right velocity sensor signals. Note, however, that these sensors 170L/170R are located at a considerable distance from the static nodes located at brace bars 140 and 140', respectively.

As explained below, this increased distance between the static nodes and the sensors reduces the resolution of the material flow measurement.

Meter electronics 20 receives the left and right velocity signals appearing on leads 165L and 165R, respectively. Meter electronics 20 also produces the drive signal appearing on lead 185 to drive element 180 which vibrates flow tubes 130 and 130'. Meter electronics 20 processes the received left and right velocity signals to compute the mass flow rate, volume flow rate and the density of the material passing through meter assembly 10.

Figure 2:
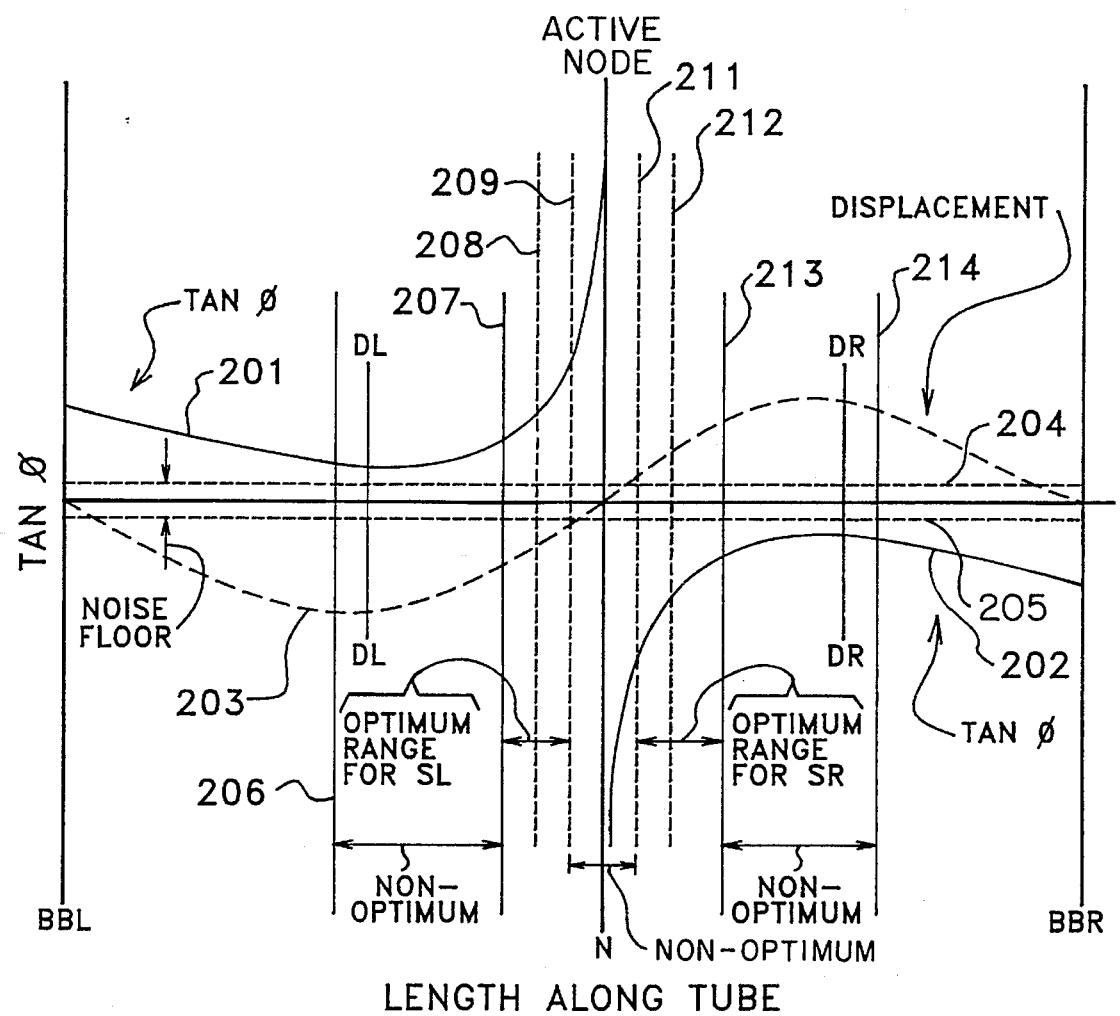
FIG. 2 is a graphical depiction of the relationship between the output signal amplitude, phase and flow tube location of sensors relative to an active node and the noise level of the associated instrumentation.

Description of FIG. 2

Figure 3:
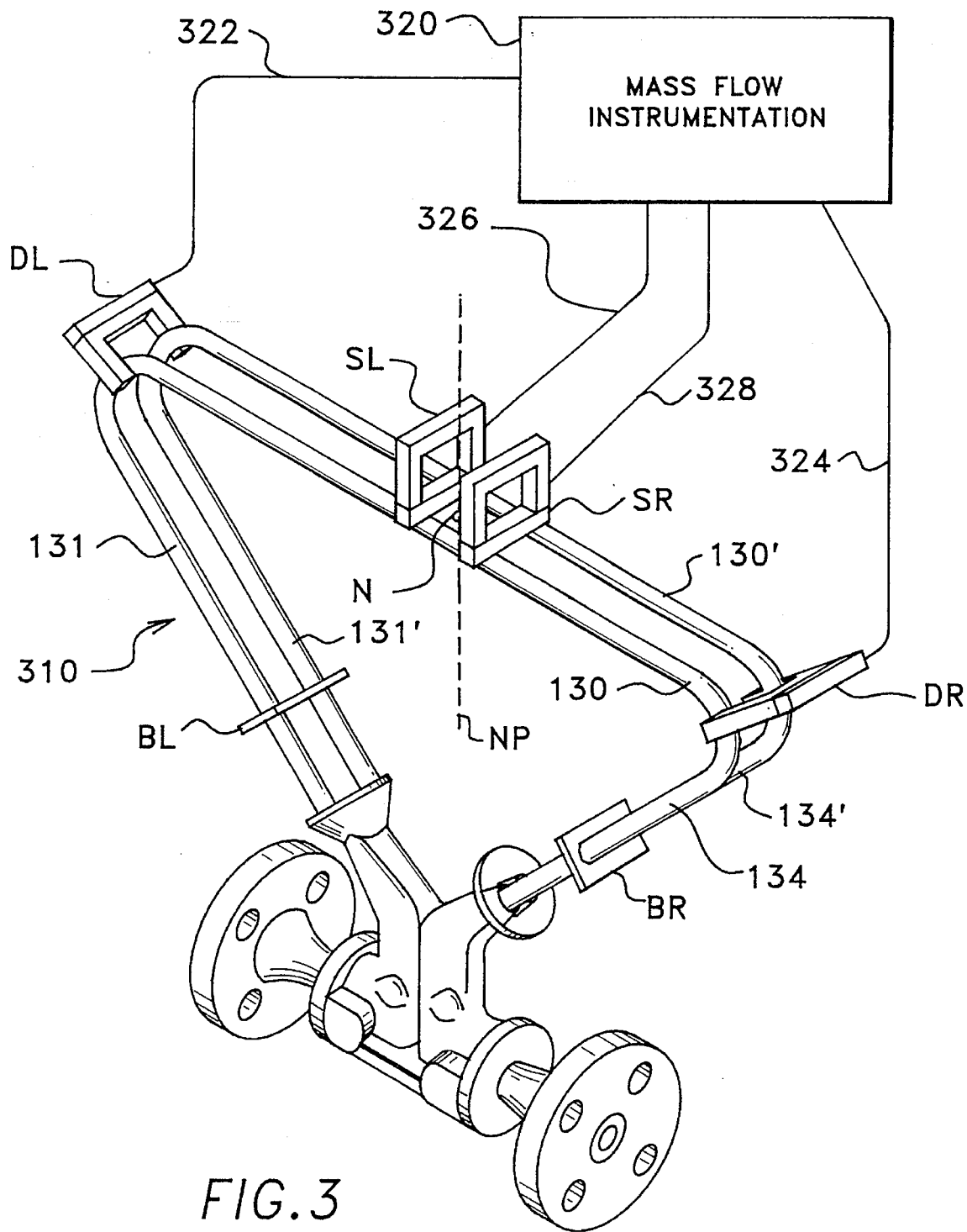
FIG. 3 illustrates an exemplary embodiment of the flowmeter of the present invention wherein a modified "U"-shaped flow tube arrangement is employed.

FIG. 2 graphically depicts the relationship between various parameters of the Coriolis flowmeter of FIG. 3 with regard to the placement of the sensors on the flow tubes. The parameters shown on FIG. 2 include the phase and displacement amplitude of the oscillated flow tubes for different possible sensor positions, the sensor output signals obtainable for the placement of the sensor on various positions of the flow tubes, the phase shift available between the output signals of the two sensors for the various sensor positions, and the noise level in the output signal of the sensors. FIG. 2 is applicable to both the bending and twisting modes of operation and applies to all shapes of Coriolis flowmeters including the flowmeters of FIG. 1 and 3.

The term "output signal amplitude" denotes the amplitude of the signal output from the pick-off sensors SL and SR of FIG. 3. The output signal amplitude is proportional to the displacement of the flow tubes from their center position. The y-axis is termed tangent Ø where tangent Ø is the phase shift between the output signals of the two sensors. The x-axis represents the distance between a single active node N and various locations at which the sensors may be controllably positioned on either side of the active node N represented by the vertical line in the middle of FIG. 2. The left vertical line BBL represents the position of the left brace bar, such as brace bar BL shown on FIG. 3. The rightmost vertical line BBR represents the location of the right brace bar BR of FIG. 3 with respect to active node N. The vertical lines DL and DR, to the left and right of the center node N represent the position of drivers DL and DR of FIG. 3.

Curve 201 represents the phase shift attainable when the left sensor SL is moved between any of its possible positions ranging from the brace bar BBL on the left to the active node N on the right. It is seen that the phase shift of this sensor output signal is at a moderate amplitude near vertical line BBL, that it decreases from there and continues to decrease in the region of the vertical line 206. It remains at a decreased noise level until the region associated with vertical line 207 is reached. From there, and proceeding to the right, the phase shift increases significantly as the sensor position approaches active node N. The phase shift of the right sensor DR is negative, as shown on the lower right-hand quadrant of FIG. 2, and varies from a moderate level in the vicinity of the position of the vertical line BBR, it decreases from there and continues to decrease in the region represented by vertical lines 214 to 213. It increases significantly in a negative direction as the sensor position approaches active node N.

The displacement of the various portions of the flow tubes are represented by the curve 203. Curve 203 also indicates the relative amplitude of the sensor output signals for each curve 203 location. It is seen that the sensor output signals 203 are below the noise floor near both the right BBR and left BBL vertical lines as well as in the vicinity of active node N represented by the locations between vertical lines 209 and 211. The flow tube locations between vertical lines 206 and 207 are non-optimum locations for the left sensor SL placement since the phase shift 201 obtainable is relatively low. The same conditions pertain to the locations for the right sensor SR between vertical lines 213 and 214. The locations between the vertical lines 207 and 209 are optimum conditions for the left sensor SL placement since the output signal amplitude and phase shift are relatively high from the left sensor SL output. Similarly, the locations for the right sensor SR between vertical lines 211 and 213 represent optimum locations for the right sensor SR because the signal amplitude and phase shift obtainable from the sensor is relatively high.

In accordance with the teachings of the present invention, the left sensor SL is controllably positioned between flow tube locations associated with lines 207 and 209 in order to avoid noise level problems and obtain an output signal of an adequate amplitude and phase shift. Similarly, the right sensor SR is controllably positioned between vertical lines 211 and 213 in order to obtain a signal having adequate amplitude and phase shift and minimum noise level.

The principle of locating sensors as close as practicable to an active or static node (or nodes) is taught by the present invention regardless of the type of flow tube employed. The sensors can straddle an active node (a node not located at a brace bar or other point of support); the sensors can even straddle two active nodes or be located as close as practicable to a static node as is subsequently described in FIG. 5. The closer the sensors are located to a node, the greater the value of Δt, and therefore the greater the sensitivity of the mass flow measurement. However, the output signal amplitude of a flow tube is inversely proportional to the value of Δt. The present invention controllably locates the sensors as close as possible to a node(s), but at a sufficient distance from the node(s) to generate an output signal amplitude having a usable signal-to-noise ratio.

Description of FIG. 3

FIG. 3 illustrates an exemplary embodiment of a flowmeter 310 of the present invention wherein a modified "U"-shaped flow tube arrangement is employed. The term "modified 'U'-shaped flow tube" is intended to encompass flow tubes including those which are substantially "D"-shaped, those which have substantially straight sections, as well as those which have essentially non-linear or curved sections. The structure and functionality of this embodiment of FIG. 3 is essentially the same as that described for FIG. 1, except for the location of the drivers DL and DR, and the pick-off sensors SL and SR. Although the drivers DL and DR are also located in a different position on the flow tubes 130, 130' relative to the device shown in FIG. 1, the description of this embodiment is primarily directed to a discussion of the various arrangements of sensors located in close proximity to one active node situated at the midpoint of the top section of flow tubes 130/130'. It is to be expressly understood that this descriptive embodiment is for explanatory purposes only and is not meant to limit the scope of the claimed inventive concept. Other embodiments are considered to be within the scope of the present invention.

The flowmeter of FIG. 3 operates in an out-of-phase twist mode to generate an active node N which is situated at the intersection of axis NP and the center of the plane defined by the center of flow tubes 130 and 130'. Drivers DL and DR are positioned at opposite ends of the straight section of the flow tubes 130/130' hereinafter referred to as the "top" section of the flowmeter. Drivers DR and DL are operated out of phase by drive signals 322 and 324 to twist the top portions 130 and 130' of the flow tubes about center point N. Coriolis flowmeter 310 has pick-off sensors SL and SR placed in close proximity to active node N in order to maximize the value of the Δt signal within the signal-to-noise constraints of the flowmeter instrumentation. Mass flow instrumentation 320 is interconnected to sensors SL and SR by paths 326 and 328, and to drivers DL and DR by paths 322 and 324, respectively. Mass flow instrumentation 320 effectively performs the same functions as the meter electronics 20 shown and described for FIG. 1.

Modes of Operation

There are two types of vibrational modes of operation which are of interest with respect to the disclosed flowmeters. These are the "bending" and "twist" modes. Flow tubes can be driven in any of several modes including the "bending mode" and various "out-of-phase twist modes". The bending mode is effected by driving the flow tubes out-of-phase about area W and W' at a relatively low resonant frequency as shown for the meter of FIG. 1. Static nodes are then created at the brace bars 140 and 140'. The brace bars 140 and 140' are also the pivot points for the out-of-phase vibrations of the flow tubes. The out-of-phase twist modes are achieved by driving the flow tubes on their sides in a twisting manner at a frequency which is normally higher than that used in bending mode. Oscillation of the flow tubes in one possible typical twist mode results in a single active node located on the top (at the midpoint) of the flow tube. This is shown in FIG. 3.

The prior art described above for FIG. 1 utilizes driver 180 on the top section 130/130' which connects the flow tube legs 131/131' and 134/134'. In this arrangement, the flow tubes are operated in a first out-of-phase "bending" mode which produces static nodes at brace bars 140 and 140'. Conventional Coriolis flow measurement devices position their sensors so that a sufficiently large output signal amplitude is generated. However, these prior Coriolis flow measurement devices have not attempted to place the sensors in close vicinity to the node(s) to maximize the phase differential of the output signals.

When the flow tube legs 131/131' and 134/134', such as shown in FIG. 3, are driven in a first out-of-phase "twist" mode. Static nodes are located in the vicinity of the brace bars, and an active node is created at the top center section (130/130'). Conventional systems, however, have not utilized this active node as a "focal point" for locating pick-off sensors.

The present invention is not limited to the placement of sensors proximate a single top center active node to provide increased measurement accuracy. The present invention also contemplates the use of other "twist" modes to provide enhanced measurement accuracy relative to conventional Coriolis flowmeters. The present invention optionally utilizes higher drive frequencies in twist mode operation to cause two or more active nodes to occur. The number and placement of the active nodes can be determined by the frequency and placement of the drivers along the flow tubes.

In the twist mode of operation, such as that of FIG. 3, the drivers are located on opposite ends of the legs of the flow tubes at any non-nodal position. In either mode of operation (bending or twist), the sensors are controllably located proximate an active node (or opposite active nodes) to maximize the value of Δt, while operating within an acceptable signal-to- noise ratio.

Figure 4:
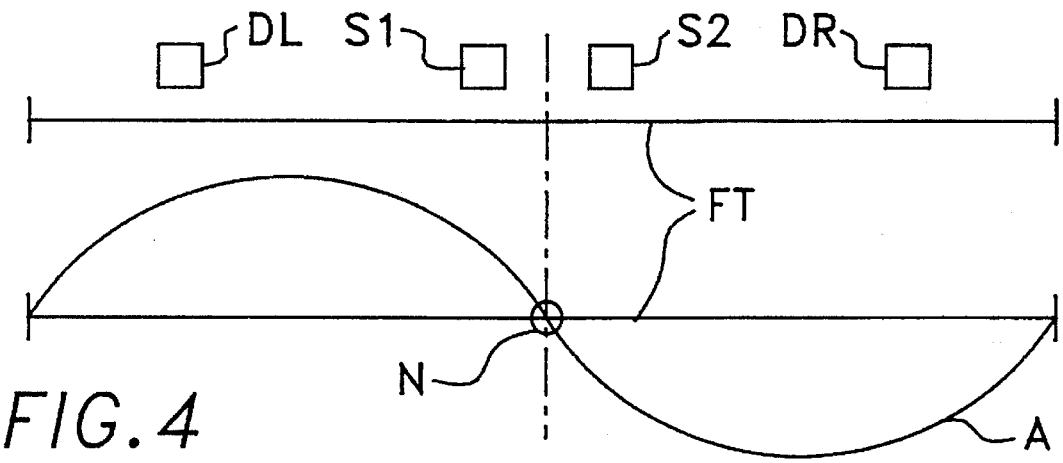
FIGS. 4 and 5 illustrate the locations of pick-off sensors and drivers for general case bending and twist modes, respectively.
Figure 5:
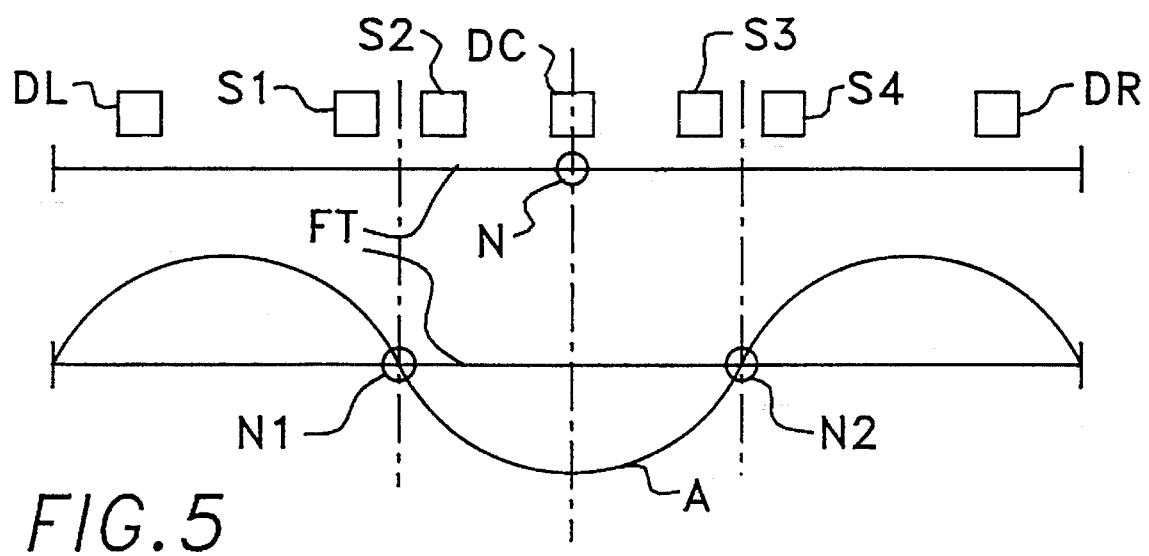

Description of FIGS. 4 and 5

FIGS. 4 and 5 illustrate the locations of sensors and drivers with respect to node positions for a "generic" flowmeter, which may be of a straight, U-shaped, or irregular configuration. FIG. 4 illustrates the amplitude of flow tube displacement, as shown by curve A, relative to the positions of sensors S1 and S2 and drivers DL and DR situated along flow tube FT with respect to (a single) active node N. Although the preferred embodiment of the present invention employs a pair of parallel flow tubes FT, only one flow tube is shown in FIG. 3 and 4 for purposes of clarity. When the flowmeter tubes are operated in twist mode according to the embodiment shown in FIG. 3, sensors S1 and S2 of FIG. 4 are located as close to practicable to active node N within the signal-to-noise ratio constraints as described for FIG. 2. Because the physical size of the sensors might, in some cases, preclude their being located close to each other in proximity of active node N, the embodiment shown in FIG. 5 offers an alternative solution to this particular problem.

FIG. 5 illustrates a flow tube(s) operated in a second out-of-phase twist mode as described in further detail below. In this twist mode, there are two active nodes N1 and N2, as well as two drivers DL and DR. While only one flow tube is shown for the sake of clarity, two flow tubes could be used. The presence of two active nodes allows a pair of sensors to be used at any of four possible locations. Thus, pairs of sensors could be located at positions S1 and S2, S3 and S4, S1 and S4, or S2 and S3. Since there are two active nodes, the ability to locate sensors on opposite sides of the flow tubes allows the sensors to be located as close as practicable to the desired nodes and eliminates the physical proximity restrictions in the case wherein both sensors need to be located on opposite sides of a given node. The embodiment of FIG. 5 may employ a center driver DC as well as drivers DL and DR if desired.

Figure 6:
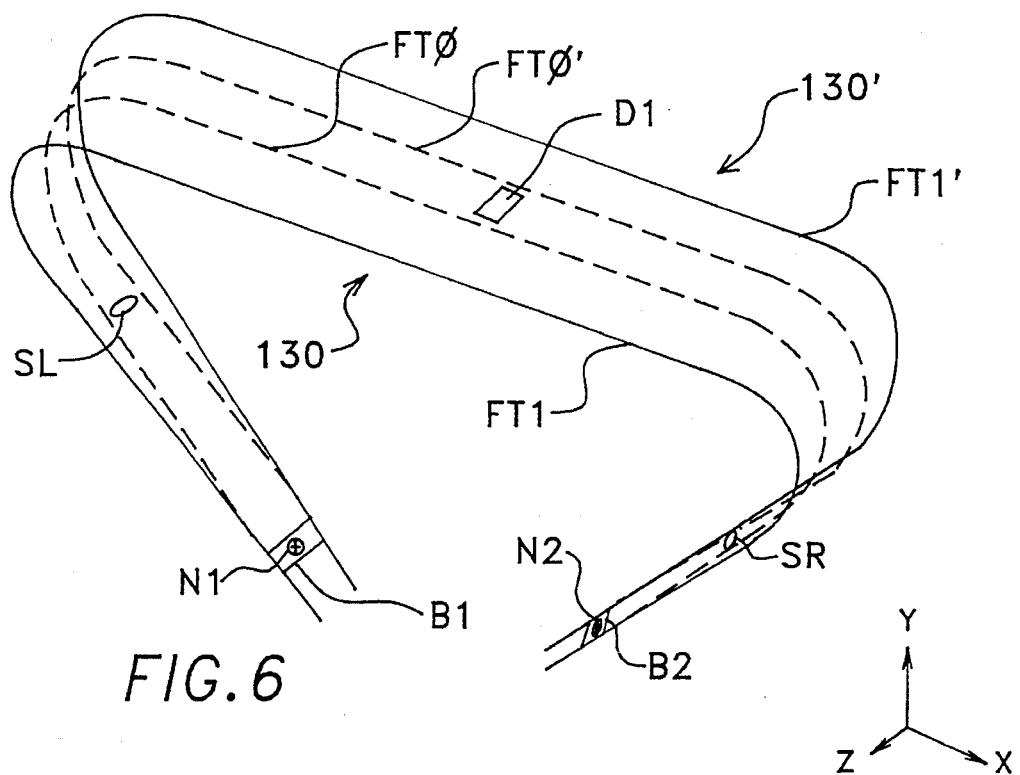
FIG. 6 illustrates the sensor and driver locations for a flowmeter operated in bending mode.

Description of FIG. 6

In accordance with the principles of the present invention, FIG. 6 illustrates the sensor and driver locations for a flowmeter operated in a first out-of-phase bending mode. This is comparable to the embodiment of FIG. 1 except for the sensor positions. FIG. 6 illustrates the zero flow state of the flowmeter elements. A zero deflection condition is shown by dotted lines. A deflected condition is shown by the solid lines. In FIG. 6, as in the prior art (shown in FIG. 1), driver D1 is located near the mid-point of the top of flow tubes 130/130' to oscillate the flow tubes so as to generate static nodes N1 and N2 at brace bars B1 and B2. In the embodiment of FIG. 6, however, sensors SR and SL are moved downward, compared to the prior art sensors 170R and 170L, to a position closer to static nodes N1 and N2. Increased flow measurement sensitivity results from such nodal-proximate positioning of the sensors.

Figure 7:
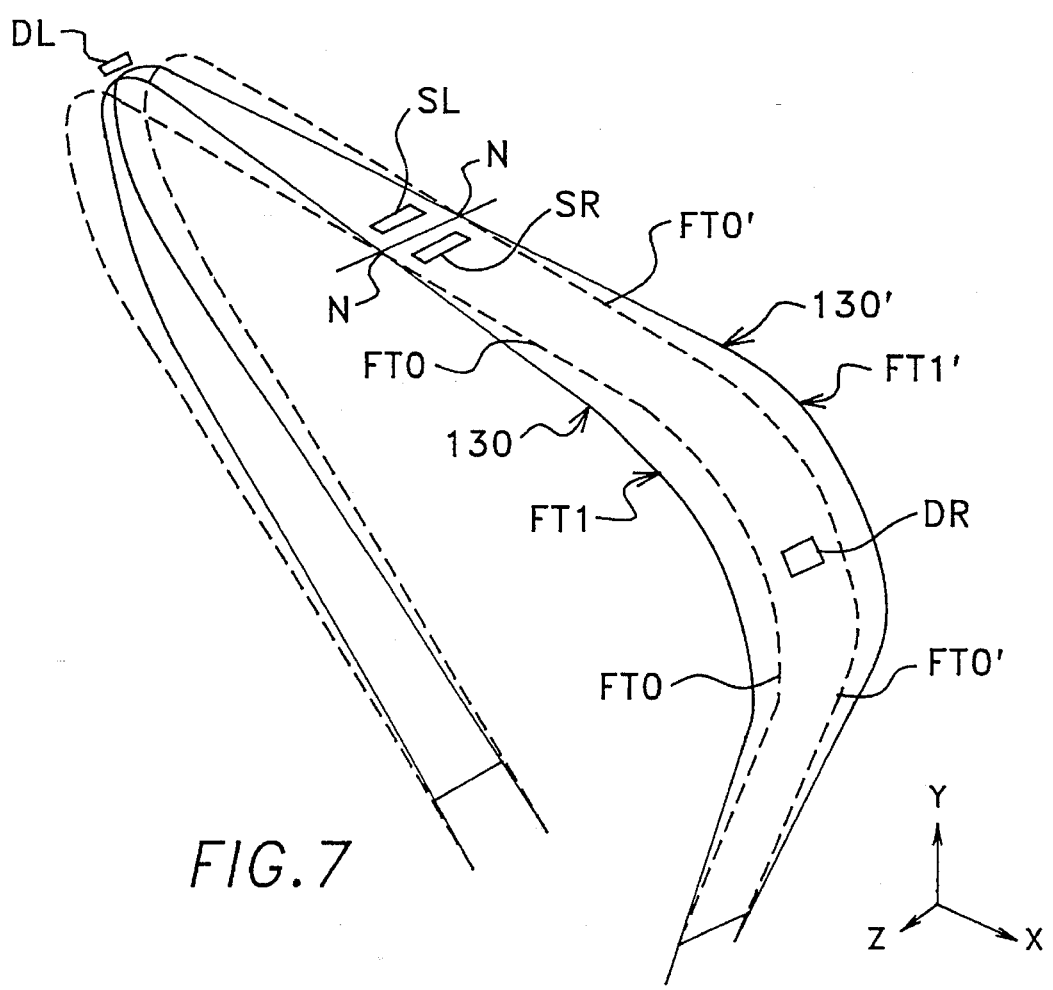
FIGS. 7 and 8 illustrate various sensor and driver locations for first out-of-phase twist mode and second out-of-phase twist mode, respectively.
Figure 8:
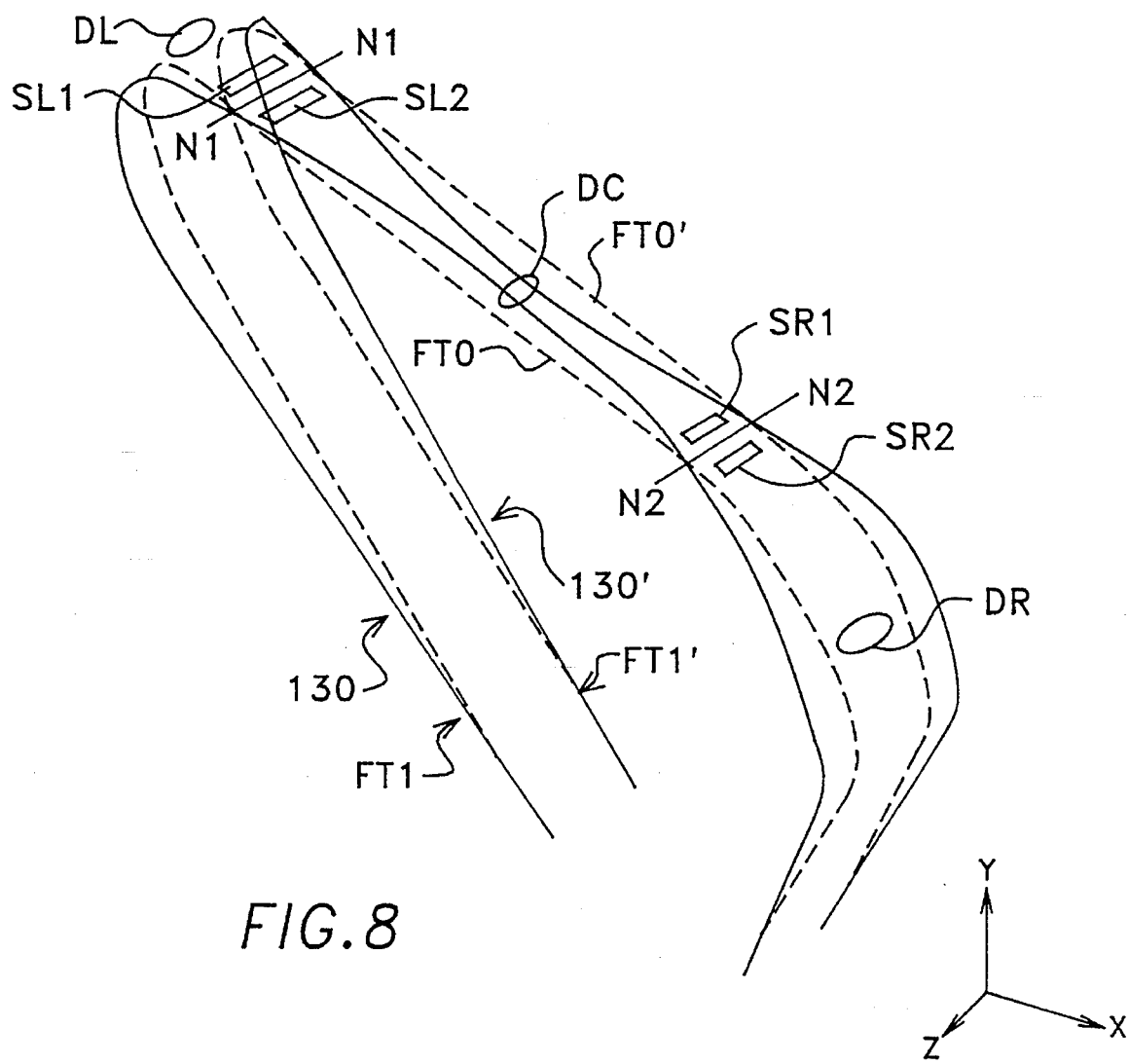

Description of FIGS. 7 and 8

FIGS. 7 and 8 illustrate sensor and driver locations for first out-of-phase twist mode, and second out-of-phase twist mode, respectively. As shown in FIG. 7, drivers DL and DR drive flow tubes 130/130' in the first out-of-phase twist mode. A zero deflection condition is denoted by dotted lines FT0 and FT0'. A nominal flow condition is indicated by lines FT1 and FT1'. In this particular twist mode, sensors SL and SR are located in close proximity to active node N. The proximity of sensors SL and SR to active node N is determined according to the guidelines set forth in the discussion of FIG. 2, above.

FIG. 8 illustrates a second out-of-phase twist mode in accordance with the present invention. FIG. 8 is comparable to FIG. 5 wherein two active nodes are generated to allow a greater latitude in the placement of the sensors. The dotted lines FT0 and FT0' represent a no-flow condition. The solid lines FT1 and FT2 represent a nominal flow condition. In this particular mode, there are three drivers employed: DL, DC, and DR. This system of drivers creates active nodes N1 and N2 on the top section of the flow tubes. Two drivers could also be used to produce the same nodes, in which case one driver must be located on the top section of the flow tube and the other driver located on either of the two sides.

Figure 9:
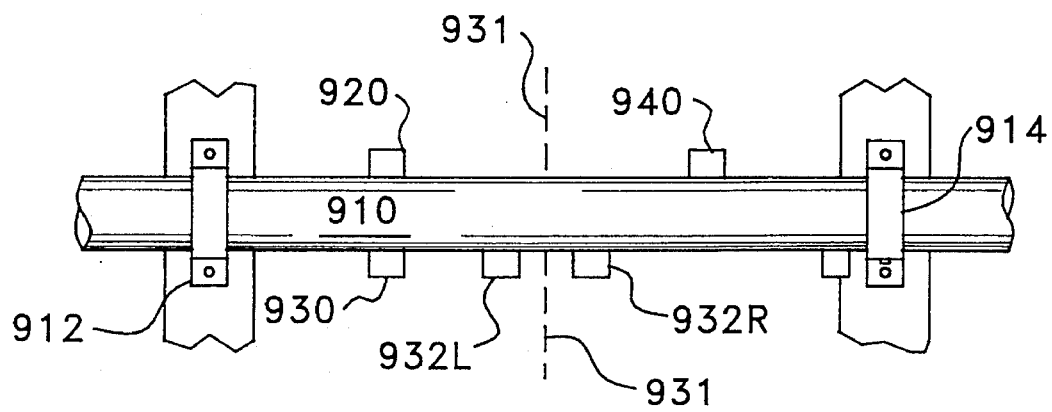
FIG. 9 illustrates another alternative embodiment of the present invention wherein a straight flow tube is employed.

Straight Tube Flowmeter of FIG. 9

Another possible exemplary embodiment of the present invention is illustrated in FIG. 9 wherein a tube section is supported by elements 912, 914. The distance between these elements determines the frequency at which tube 910 vibrates since the distance is at least one wave length of the drive frequency. In instances where the length of tube 910 is too long for the flowmeter to practically be operable, support(s) in addition to and in between elements 912 and 914 can be mounted on tube 910. The flowmeter elements of the present invention are clamped onto tube 910 without any substantial modifications or alterations of the tube being required to measure the mass flow rate of the material being transported within the tube. Tube 910 is shown as being substantially straight and is of constant cross-section. It is to be understood that the flowmeter of the present invention is usable on various shapes and configurations of tubes.

The embodiment of FIG. 9 includes driver 920 which is clamped directly onto tube 910 at or near an anti-node of the second harmonic of the natural frequency or at any other location except a node of the second harmonic of the natural frequency. Additional drivers, similar to driver 920 can also be clamped onto tube 910 to add symmetry or to equalize the loading on the tube. However, the system of the present invention is operable with only one driver, as shown. Driver 920 may be connected to a feedback circuit which includes motion sensor 930 which is mounted on the tube directly opposite driver 920 or near driver 920 or affixed onto driver 920.

The flowmeter elements further include motion sensors 932L and 932R mounted onto tube 910 as close as practicable to a active node location, shown by dotted line 931. Counterweight 940 may be mounted on tube 910 at a predetermined location, such as a harmonic anti-node of the natural vibration frequency of tube 910, to balance the load created by driver 920. If desired, a second driver may be mounted at this location, or the counterweight 940 or a second driver can be eliminated.

Figure 10:
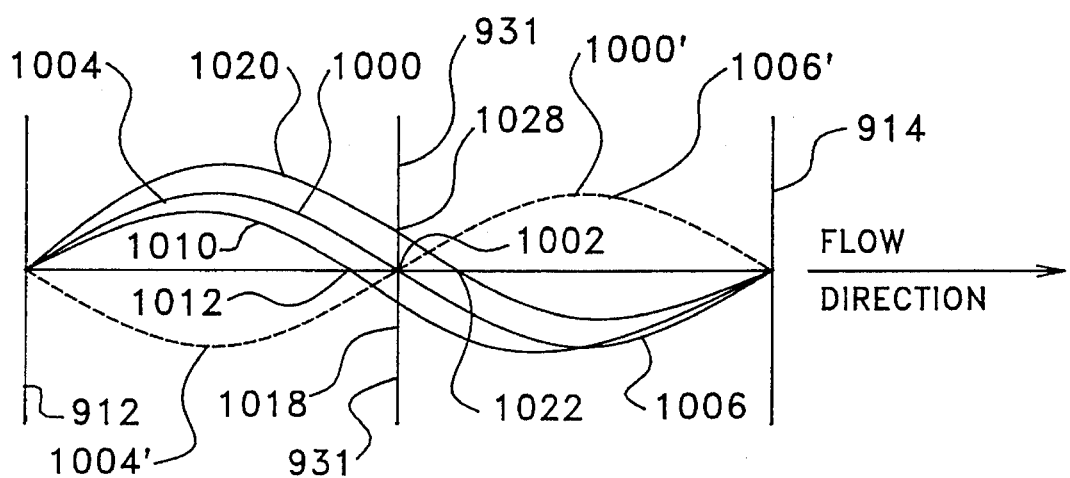
FIG. 10 illustrates the displacement of various portions of the flow tube of FIG. 9.

Operation of the System of FIG. 10

FIG. 10 portrays the displacement of various portions of flow tube 910 in operation. The amplitude curve 1000 of FIG. 10 portrays the zero flow state of tube 910 vibrating at its second harmonic frequency.

Curve 1000 has zero amplitude at each end where the tube is fixed by supports 912, 914, and at the active node location 1002 if there is no flow. The peak amplitudes of curve 1000 occur at anti-nodes 1004 and 1006. Driver 920 applies a transverse force to tube 910 and then releases this force to cause tube 910 to oscillate. This is indicated by amplitude curve 1000 during the forced portion of the cycle and by amplitude curve 1000' during the unforced portion of the cycle. Anti-nodes 1004, 1006 are reversed in amplitude in every cycle and have locations at 1004', 1006' during the unforced portion of the cycle.

The vibration of tube 910 with material flowing therethrough produces Coriolis forces on each element of the tube. The amplitude curves 1010, 1020 of the tube with fluid flow are illustrated in FIG. 2. The tube 910 deflection amplitudes are exaggerated on FIG. 2 in order to explain the operation of the system. The effect of the Coriolis forces on tube 910 causes amplitude curve 1010 (corresponding to the first portion of the driving cycle) to shift to the left as compared to amplitude curve 1000 of the zero flow state. The material flowing in tube 910 is resistive to effects imparted by the vibrating tube. The initial portion of curve 1010 is reduced in amplitude as compared to curve 1000 due to the Coriolis force effects of the material acting against the walls of tube 910. This causes the active node (the point of zero amplitude) of the amplitude curve 1010 to shift to position 1012. Likewise, the Coriolis force effects on tube 910 during the second portion of the cycle result in amplitude curve 1020 of the tube. Node 1022 (point of zero amplitude) of curve 1020 leads node 1002 of curve 1000.

The cyclical longitudinal displacement of node 1012 and node 1022 creates a cyclical transverse amplitude displacement of the location 1002 of tube 910. This transverse displacement, illustrated in FIG. 10, occurs between point 1018 of curve 1010, showing the displacement of curve 1010 from active node location 1002, and point 1028 of curve 1020 showing the displacement of curve 1020 from active node location 1002. This cyclical transverse displacement of the active node location is due to the Coriolis force effects of the fluid flow through vibrating tube 910. Since the Coriolis force effects are due to the mass of the material flowing in tube 910, the measured transverse acceleration and the displacement derived from it is directly indicative of the mass flow rate of the material.

It is to be expressly understood that the claimed invention is not to be limited to the description of the preferred embodiment but encompasses other modifications and alterations within the scope and spirit of the inventive concept.

We claim:

1. A Coriolis flowmeter for measuring the characteristics of process material flowing through said flowmeter, said flowmeter comprising:

flow tube means;

driver means for vibrating said flow tube means to generate at least one node on said flow tube means;

a pair of sensor means each of which is affixed to said flow tube means proximate said at least one node;

said sensor means being responsive to said vibration of said flow tube means and to said flow of said process material to generate sensor output signals representing the movement of said vibrating flow tube means due to the Coriolis forces generated by material flow within said flow tube means;

said sensor means being controllably positioned on said flow tube means with respect to said at least one node so that there is a maximum phase differential between said output signals as well as a signal amplitude adequate to enable said output signals to have a predetermined signal to noise ratio; and signal processing means responsive to said generation of said output signals for generating information indicative of said material flow in said flow tubes.

2. The flowmeter of claim 1 wherein said flow tube means comprises a pair of substantially parallel flow tubes.

3. The flowmeter of claim 2 wherein: said flow tubes have a top portion and a pair of side legs having a lower portion connected to brace bars; and wherein said driver means vibrates said flow tubes in an out of phase bending mode in which said flow tubes pivot about said brace bars operating as static nodes.

4. The flowmeter of claim 3 wherein said flow tubes have a pair of static nodes coincident with said brace bars and wherein said sensors means are proximate said brace bars.

5. The flowmeter of claim 3 wherein said flow tubes also have a pair of active nodes spaced apart from said brace bars and wherein said sensor means comprises a pair of sensors each proximate a different one of said pair of active nodes.

6. The flowmeter of claim 3 wherein said flow tubes also have a pair of active nodes spaced apart from said brace bars and wherein said sensor means comprises a pair of sensors proximate to and on different sides of one of said pair of active nodes.

7. The flowmeter of claim 3 wherein said driver means is affixed to a top portion of said flow tubes.

8. The flowmeter of claim 3 wherein said driver means comprises a pair of spaced apart drivers positioned on said flow tubes.

9. The flowmeter of claim 2 wherein: said flow tubes have a top portion and a pair of side legs; and said driver means vibrates said flow tubes in a first out of phase twisting mode so that said at least one node comprises a single active node located on said flow tubes.

10. The flowmeter of claim 9 wherein said single active node is located on said top center portion of said flow tubes.

11. The flowmeter of claim 9 wherein said sensor means comprises a first sensor positioned on a first side of said single active node and a second sensor positioned on a second side of said single active node.

12. The flowmeter of claim 9 wherein: said flow tubes have a top portion and a pair of side legs; and said driver means vibrates said flow tubes in a second out of phase twisting mode so that said at least one node comprises a pair of active nodes on said flow tubes.

13. The flowmeter of claim 9 wherein: said flow tubes are of a modified U-shaped configuration having a top portion and a pair of side legs; and said driver means vibrates said flow tubes in a second out of phase twisting mode so that said at least one node comprises a pair of active nodes on top portion of said flow tubes.

14. The flowmeter of claim 12 wherein said sensor means comprises a first sensor positioned on a first side of a first one of said active nodes and a second sensor positioned on a second side of a second one of said pair of active nodes.

15. The flowmeter of claim 12 wherein said sensor means comprises a first sensor positioned on a first side of a first one of said pair of active nodes and a second sensor positioned on a second side of said first one of said pair of active nodes.

16. The flowmeter of claim 1 wherein said flow tube means comprises a substantially straight tube.

17. The flowmeter of claim 1 wherein said flow tube means comprises a pair of flow tubes having an irregular configuration.

18. A method of operating a Coriolis flowmeter having flow tube means, said method comprising the steps of:

vibrating said flow tube means to generate at least one node on said flow tube means;

controllably affixing each of a pair of sensor means to said flow tube means proximate said at least one node so as to generate a maximum phase differential between said output signals as well as a signal amplitude adequate so that said output signals have a predetermined signal to noise ratio;

receiving output signals of said sensor means in response to said vibration of said flow tube means for generating a signal representing the movement of said vibrating flow tube means due to the Coriolis forces generated by material flow within said flow tube means; and operating signal processing means in response to said generation of said output signals for generating information indicative of said material flow in said flow tube means.

19. The method of claim 18 wherein:

said flow tube means comprises a pair of flow tubes of a modified U-shaped configuration having a top portion and a pair of side legs; and said driver means is affixed to said top portion to vibrate said flow tubes in a bending mode out of phase with respect to each other about a brace bar means operating as a static node.

20. The method of claim 18 wherein:

said flow tube means comprises a pair of flow tubes of a modified U-shaped configuration having a top portion and a pair of side legs; and drivers are affixed to said side legs to vibrate said flow tubes in a twisting mode out of phase with respect to each other and so that said at least one node comprises an active node on said top potion of said flow tubes.

21. The method of claim 18 wherein:

said flow tube means comprises a pair of flow tubes of a modified U-shaped configuration having a top portion and a pair of side legs; and drivers affixed to said side legs to vibrate said flow tubes in a twisting mode out of phase with respect to each other to generate two active nodes on said top portion of said flow tubes.

22. A method of operating a Coriolis flowmeter having first and second flow tubes positioned substantially parallel to each other, said method comprising the steps of:

vibrating said first and second flow tubes in a first out-of-phase twisting mode to generate at least one vibrational active node on each of said flow tubes;

affixing each of a pair of sensors to said flow tubes proximate said at least one vibrational active node to generate sensor output signals having a maximum phase difference therebetween as well as a signal amplitude adequate to provide a predetermined signal to noise ratio for said output signals;

said output signals representing the relative movement of said vibrating flow tubes as they are twisted by Coriolis forces generated by material flow within said flow tubes; and operating signal processing means in response to said generation of said output signals for generating information indicative of said material flow in said flow tubes.

\* \* \* \* \*